April 28, 1964
J. L. BURDOCK
3,131,043
GAS SCRUBBER
Filed Feb. 24, 1961
2 Sheets-Sheet 2
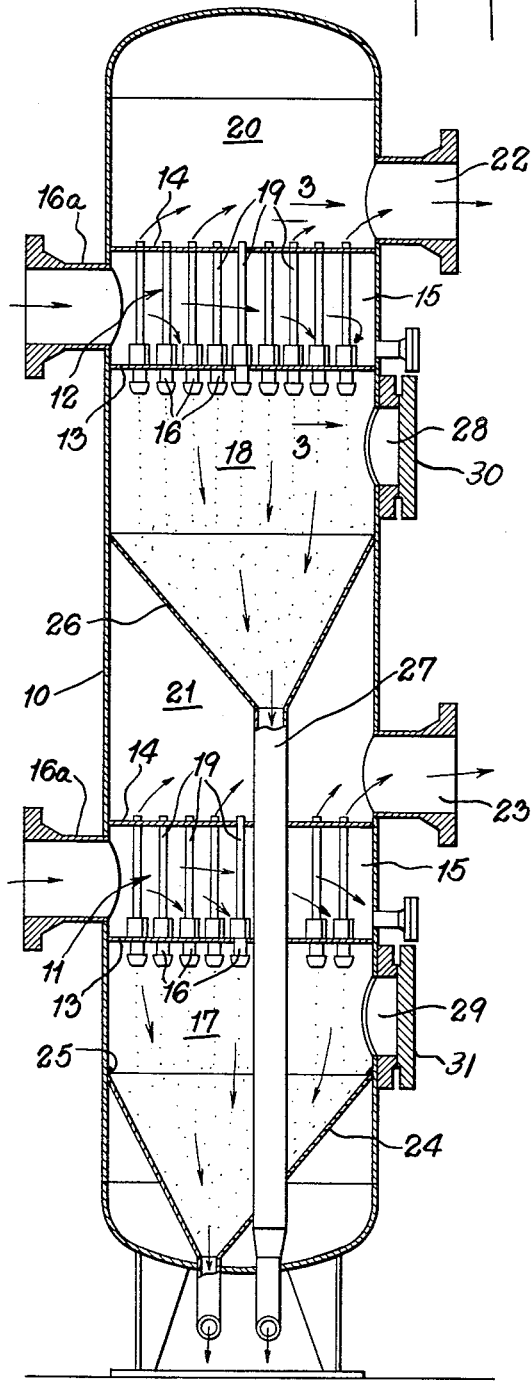
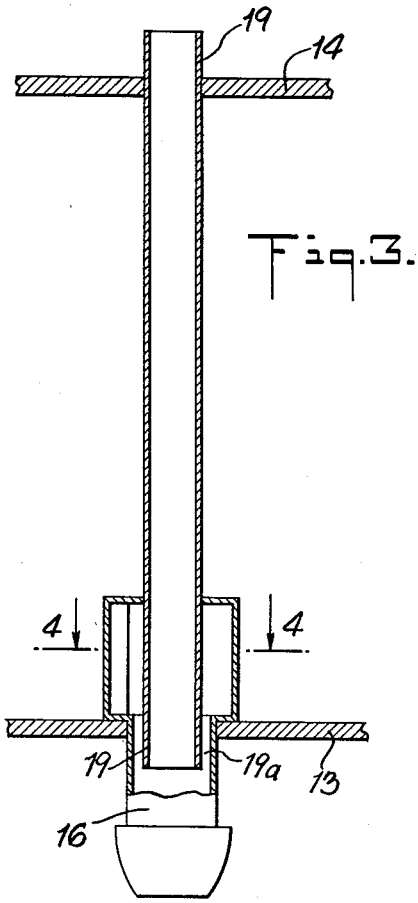
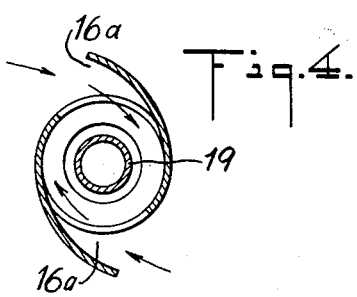
INVENTOR
Joseph L. Burdock
BY
Benj. T. Rauber
ATTORNEY United States Patent Office 3,131,043
Patented Apr. 28, 1964

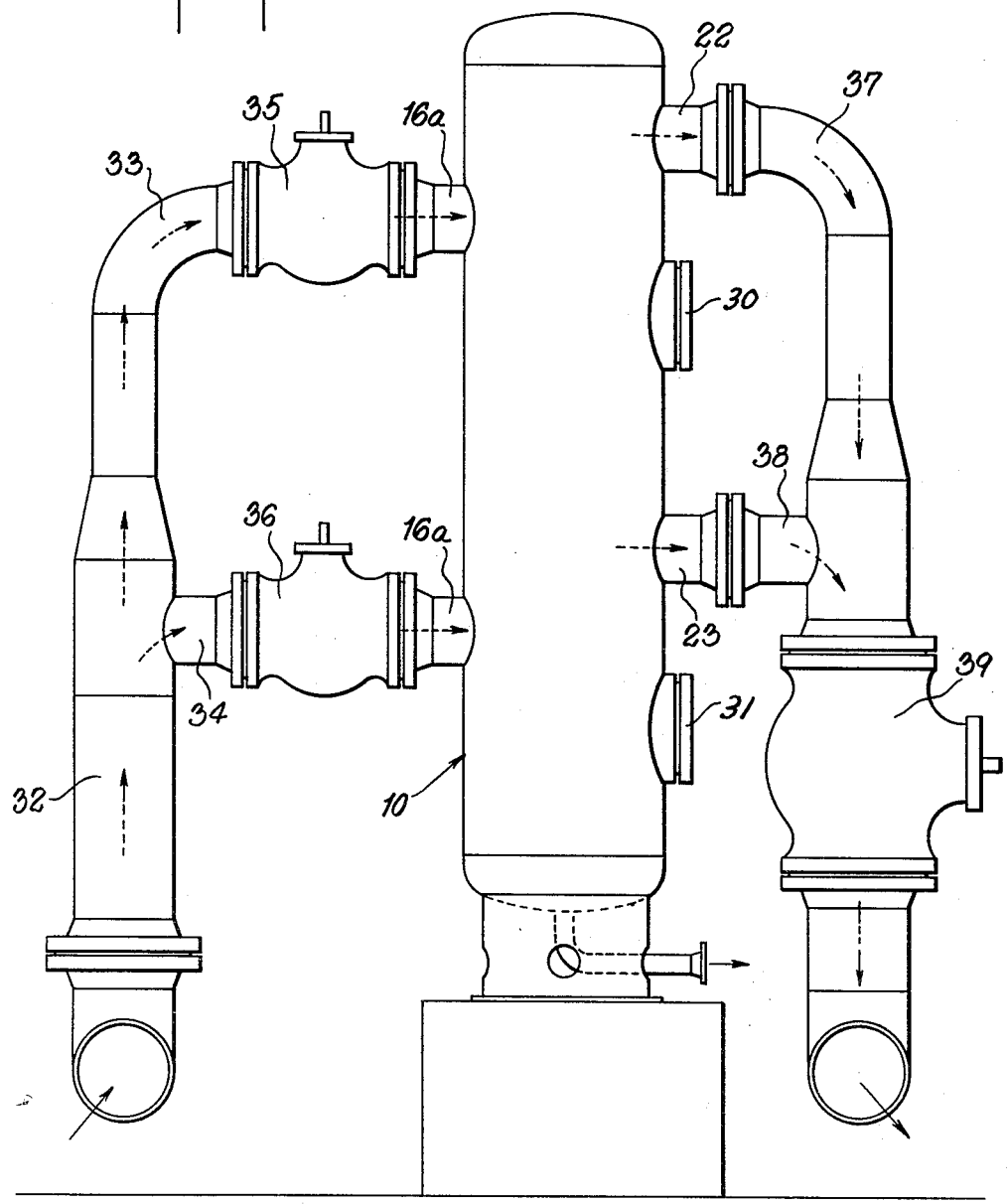

3,131,043
GAS SCRUBBER
Joseph L. Burdock, Old Greenwich, Conn., assignor to Aerotec Industries, Inc., Greenwich, Conn., a corporation of Connecticut
Filed Feb. 24, 1961, Ser. No. 91,440
4 Claims. (Cl. 55—346)

My present invention relates to a centrifugal gas scrubber particularly for separating suspended particles from gases under heavy pressure.

Natural gas occurs under very heavy pressure, frequently under pressures of 2000 pounds per square inch, and is delivered under these pressures to the distributing system. The gas, as it issues from the well generally carries in suspension, not only solid particles, but liquid particles containing very volatile or low boiling constituents which would volatilize upon a reduction in the pressure of the gas. As these volatile products are valuable, it is desirable to separate them as well as the other suspended particles while the gas is under its high pressure. Another advantage in separating the particles under high gas pressure is that the equipment may be made more compact than it would be for the same capacity if the pressure were lowered and the gas expanded.

To hold the gas under the high pressure during the separation of the particles requires a container for the separation means of strong, heavy, construction to withstand the force of the gas pressure. The more compact the separating apparatus, the less will be the thickness of the container walls required as the bursting force is a function of the pressure of the gas and the diameter of the container. Practical considerations of weight thus place a limit on the diameter of the apparatus and therefore a limit on its capacity.

My invention provides a separating apparatus having increased separating capacity relative to the size and weight of the apparatus.

In separating apparatus it is desirable to have the gas treating capacity suited to the amount of gas passing through the apparatus in order to approximate the speed of the gas through the separator tubes to the optimum speed for centrifugal separation. The amount of gas passing through the apparatus may on occasion be varied to suit the demand. The apparatus of my invention further provides apparatus and a piping system in which the number of separating tubes in action may be varied in accordance with the amount of gas passing through the apparatus.

In the apparatus of my invention I provide in an upright cylindrical container two or more tiers of centrifugal tube assemblies, a pair of tiers of centrifugal tube assemblies being shown in the accompanying drawings, in which centrifugal tubes and off-take pipes are mounted. Each tier comprises a pair of tube sheets spaced vertically to form a plenum chamber, the centrifugal tubes being mounted in the lower tube sheet to receive gas to be treated supplied from the plenum chamber and to deliver separated particles to a collecting chamber below the tube sheet and the off-take pipes being mounted in the upper tube sheet, each off-take pipe extending from within the upper end of a centrifugal tube through the upper tube sheet into an off-take chamber above the tube sheet. The centrifugal tubes may be of known type in which the gas enters with a rotary movement. A collecting hopper is mounted between the upper tier and the lower tier to collect the particles from the tubes of the upper tier and to divide the space between the tiers into an off-take chamber for the lower tier and a collecting chamber for the upper tier. Collected particles from both tiers are conducted from the apparatus through pipes extending downwardly through the collector. Gas to be cleaned is admitted to the plenum chamber of each tier through an inlet and the cleaned gas is taken off through an outlet from its respective off-take chamber.

To enable the gas to be apportioned to the tiers, a piping system is provided to deliver gas to be treated to the plenum chambers between the tube sheets of each tier and to be withdrawn from each off-take chamber. Valves in the piping system permit the closing of one of the separator systems when the demand for gas is sufficiently decreased.

A gas scrubber embodying a preferred embodiment of my invention is illustrated by way of example in the accompanying drawings in which:

FIG. 1 is an elevation of the apparatus showing the piping system;

FIG. 2 is a vertical section on a smaller scale of the container and separating elements;

FIG. 3 is a vertical section on a larger scale of a centrifugal tube and off-take pipe, and FIG. 4 is a section taken on line 4—4 of FIG. 3.

In the apparatus shown in the accompanying drawings the centrifugal tubes and tube sheets are contained in an upright or vertical cylindrical container. The container may be of a size to suit the requirements of a particular situation. For example, it may be twenty feet in height, four feet in diameter and have a wall thickness of about an inch or more.

Within the container 10 are mounted a lower tier 11 of tubes and, spaced above it, an upper tier of tubes 12. These tiers are substantially identical in construction and operation and corresponding reference characters are used in each. Each tier comprises a lower tube sheet 13 and spaced above it an upper tube sheet 14, the space between them forming a plenum chamber 15 into which gas to be treated is admitted through an inlet 16a. A number of centrifugal tubes 16 are mounted in the lower tube sheet 13 of each tier. Each centrifugal tube has tangential openings 16a above the tube sheet 13, FIG. 4, to receive gas from its plenum chamber and impart to the gas a rotary movement about the axis of the tube to throw suspended particles centrifugally to the inner surface of its tube. The particles thus separated then pass through the lower, open, end of the tube into a collecting chamber, the collecting chamber of the lower tier being shown at 17 and the collecting chamber of the upper tier being indicated at 18.

Mounted in the upper tube sheet 14 of each tier are off-take pipes 19, one for each tube 16, and extending from the upper part of its tube through the tube sheet 14 into an off-take chamber 20 for the upper tier and 21 for the lower tier. The lower end of each off-take pipe 19 extends coaxially into the upper part of its tube 16 to form an annular passage 19a, FIG. 3, for the rotating gas and has an open end to receive the cleaned gas and conduct it to the off-take chamber 20 or 21.

The off-take chambers 20 and 21 are provided with outlet openings 22 and 23, respectively for withdrawing the cleaned gas.

The lower collecting chamber 17 is provided with a hopper or funnel 24 sealed by welding to the inner surface of the container 10 as indicated at 25 and having a drainage pipe extending through the bottom of the container for the withdrawal of separated material. Similarly a hopper or funnel 26 is provided between the upper and lower tiers to collect the separated material from the collecting chamber 18 and has a drainage pipe 27 extending from its lower end through the tube sheets of the tier 11 and the hopper 24 and the bottom of the container. The hopper 26 is secured gas-tightly to the inner wall of the container and to the tube sheets of the tier 11 as by welding to divide the space between the upper and lower tiers into the collecting chamber 18 of the upper tier and the off-take chamber 21 of the lower tier. It may be noted that, as the pressure differences within the container are slight or negligible, the tube sheets and hoppers may be of light gauge metal as compared with the container wall. The container may be provided with openings 28 and 29 to the collecting chambers 18 and 17, respectively for inspection and repair or for cleaning, these openings being normally closed by closure plates 30 and 31, respectively.

Gas to be treated is supplied through a pipe 32 having a branch 33 to the upper inlet 16a and a branch 34 to the inlet 16a to the lower tier. Shut-off valves 35 in the upper branch and 36 in the lower branch enable the gas to be shut off from either or both tiers. The treated gas is taken from the upper outlet 22 through a branch 37 and from the lower outlet 23 through a branch 38 to a main 39. This system enables either tier to be closed and the other to be used when the flow of gas is reduced to half or less thereby more nearly maintaining the gas velocity through the centrifugal tubes.

My invention has the advantage over a larger diameter container having the same number of centrifugal tubes that a thinner wall container may be used, thus saving in weight and cost and also in that, there being a lesser number of centrifugal tubes in one chamber there is less danger of recirculation, that is, less danger of the gas flowing down through tube or tubes into the collecting chamber and back through another tube or tubes into the plenum chamber. Such recirculation reduces the efficiency of multi-tube centrifugal apparatus. The scrubber of my invention has the advantage over two separate separators of the same diameter as the container of my invention of a smaller area of container wall and greater compactness.

To obtain the maximum of efficiency in the centrifugal separation of suspended particles from gases, the velocity of the gases flowing about the interior of the tubes must be as large as practical considerations of pressure drop, etc. permit. As the centrifugal force is proportional to the square of the velocity the centrifugal force decreases rapidly with a decrease in velocity of the gases. The velocity is dependent on the volume of gas passing through the apparatus and when the demand for gas, and accordingly the amount passing through the apparatus, decreases the efficiency of separation may decrease accordingly. The present invention provides a compensation for variations in demand and in volume of gas treated. For example, with two tiers, if the demand and volume should decrease to one-half the velocity of gas can be restored by closing valve 35 or 36 and using one tier. With three tiers the full velocity could be restored at two-thirds and one-third of the rated volume. Even finer adjustments would be obtained with four tiers. Such adjustment might be made manually or automatically with known devices. Unit variations may be made with the unit on the line.

In the scrubber of my invention the maintenance costs are less, there are less valves and piping and no internal moving parts. Construction costs are less, the foundation costs are reduced and less connecting apparatus, namely piping, valves, etc., are required. Space is also economized.

Having described my invention, I claim:

1. Apparatus for separating suspended particles from gas under pressure which comprises an upright cylindrical container, an upper separating unit in said container comprising an upper tube sheet, a lower tube sheet and a collecting hopper below said lower tube sheet, each of said tube sheets and hopper spanning the space in said container and sealed to the cylindrical wall of said container to form a plenum chamber between said tube sheets, an off-take chamber above said upper tube sheet and a collecting chamber between said lower tube sheet and said hopper, and a lower separating unit comprising an upper tube sheet below said collecting hopper spanning the area within said container and sealed fluid-tightly to the cylindrical wall of said container to form an off-take chamber between said upper tube sheet of said lower separating unit and said hopper, and a lower tube sheet below said upper tube sheet spanning the area within said container and sealed fluid-tightly to the cylindrical wall of said container to form a plenum chamber between said tube sheets and a collecting chamber below said lower tube sheet, centrifugal tubes mounted in said lower tube sheet of each separating unit to receive gas from the plenum chamber of its unit and to deliver separated particles to the collecting chamber of the respective unit, and off-take pipes mounted in said upper tube sheet of each unit and each positioned to extend from within the upper part of a centrifugal tube to said off-take chamber of its respective unit, and a drain pipe for each collecting chamber separate from the drain pipe of the collecting chamber of the other unit, said container having an inlet to each said plenum chamber and an outlet from each off-take chamber.

2. The apparatus of claim 1 in which the drain pipe from the collecting chamber of the upper tier passes fluid-tightly through the chamber of the lower unit.

3. The apparatus of claim 1 in which said receiving hopper of said upper tier is of inverted conical shape and in which a hopper of inverted conical shape is provided in the collecting chamber of said lower tier.

4. The apparatus of claim 1 having an inlet piping system having a branch to the plenum chamber of each tier, each branch having a shut-off valve and an off-take piping system having a branch from the off-take chamber of each tier, each branch having a shut-off valve.

References Cited in the file of this patent

UNITED STATES PATENTS

| 956,817 | Morscher | May 3, 1910 |
| 2,268,170 | Schmidt | Dec. 30, 1941 |
| 2,372,514 | Pootjes | Mar. 27, 1945 |
| 2,708,486 | Hedberg | May 17, 1955 |

FOREIGN PATENTS

| 519,255 | Great Britain | Mar. 20, 1940 |
| 692,210 | Great Britain | June 3, 1953 |